US009328905B2

(12) United States Patent
Hong

(10) Patent No.: US 9,328,905 B2
(45) Date of Patent: May 3, 2016

(54) ORGANIC LIGHT EMITTING DISPLAY ILLUMINATING APPARATUS

(75) Inventor: Il-Hwa Hong, Yongin (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 1058 days.

(21) Appl. No.: 13/444,179

(22) Filed: Apr. 11, 2012

(65) Prior Publication Data

US 2012/0300476 A1  Nov. 29, 2012

(30) Foreign Application Priority Data

May 23, 2011 (KR) .................. 10-2011-0048504

(51) Int. Cl.
| | |
|---|---|
| H05B 33/00 | (2006.01) |
| F21V 21/00 | (2006.01) |
| F21V 23/02 | (2006.01) |
| F21V 15/01 | (2006.01) |
| F21V 17/10 | (2006.01) |
| F21W 131/103 | (2006.01) |
| F21Y 105/00 | (2016.01) |
| H01R 13/08 | (2006.01) |

(52) U.S. Cl.
CPC ............. *F21V 23/023* (2013.01); *F21V 15/01* (2013.01); *F21V 17/104* (2013.01); *F21V 17/105* (2013.01); *F21W 2131/103* (2013.01); *F21Y 2105/008* (2013.01); *H01R 13/08* (2013.01); *Y02B 20/36* (2013.01)

(58) Field of Classification Search
None
See application file for complete search history.

(56) References Cited

U.S. PATENT DOCUMENTS

| | | | | |
|---|---|---|---|---|
| 6,034,470 A | * | 3/2000 | Vollkommer | ......... H01J 61/305 313/483 |
| 2005/0259445 A1 | | 11/2005 | Hitzschke et al. | |

FOREIGN PATENT DOCUMENTS

| | | |
|---|---|---|
| JP | 2010-244766 A | 10/2010 |
| KR | 10-2002-0082624 A | 10/2002 |
| KR | 10-2006-0048021 A | 5/2006 |
| KR | 10-2009-0038950 A | 4/2009 |

* cited by examiner

*Primary Examiner* — Ashok Patel
(74) *Attorney, Agent, or Firm* — Lee & Morse, P.C.

(57) ABSTRACT

Embodiments may be directed to an OLED illuminating apparatus including a lamp unit including a panel with an organic emission unit, a connection terminal electrically connected to the organic emission unit, and a housing coupled to the panel, the housing including a relay terminal that is electrically connected to the connection terminal; and a supporting unit detachably coupled to the lamp unit, the supporting unit supporting the lamp unit and supplying electric power to the organic emission unit by connecting to the relay terminal when coupled to the lamp unit.

11 Claims, 5 Drawing Sheets

ORGANIC LIGHT EMITTING DISPLAY ILLUMINATING APPARATUS

CROSS-REFERENCE TO RELATED PATENT APPLICATION

This application claims the benefit of Korean Patent Application No. 10-2011-0048504, filed on May 23, 2011, in the Korean Intellectual Property Office, the disclosure of which is incorporated herein in its entirety by reference.

BACKGROUND

1. Field

Embodiments relate to an illuminating apparatus using an organic light emitting display (OLED).

2. Description of the Related Art

In general, organic light emitting displays (OLEDs) emit light when holes and electrons, injected through an anode and a cathode, recombine with each other in a light emission layer disposed between the anode and the cathode. When the OLED is applied to an illuminating apparatus, the illuminating apparatus may emit light with high brightness.

SUMMARY

Embodiments are directed to an organic light emitting display (OLED) illuminating apparatus.

According to an embodiment, there may be an organic light emitting display (OLED) illuminating apparatus including: a lamp unit including a panel with an organic emission unit, a connection terminal electrically connected to the organic emission unit, and a housing coupled to the panel, the housing unit including a relay terminal that is electrically connected to the connection terminal; and a supporting unit detachably coupled to the lamp unit, the supporting unit supporting the lamp unit and supplying electric power to the organic emission unit by connecting to the relay terminal when coupled to the lamp unit.

The housing may include: a first housing including the relay terminal and installed on a portion of a circumferential surface of the panel; and a second housing installed to surround a remaining portion of the circumferential surface of the panel.

The first housing and the second housing may be formed of elastic insulating materials.

The first housing and the second housing may be detachably coupled to each other via a first coupling unit.

The first coupling unit may include a coupling recess formed in the first housing and a coupling hook formed on the second housing so as to be elastically inserted into the coupling recess.

The supporting unit may be detachably coupled to the lamp unit via the second housing and a second coupling unit.

The second coupling unit may include a plurality of magnetic bodies installed on the supporting unit and the second housing so as to be magnetically coupled to each other. The second coupling unit may further include a first slide rib on the supporting unit, and a second slide rib on the second housing, the first and second slide ribs being slidable into and out of a coupling engagement with each other.

The second slide rib may include a magnetic body.

The relay terminal may include: a head portion fixed in the first housing; a moveable pin having a first end moveably inserted into the head portion and a second end contacting the connection terminal; and a spring for providing an elastic force toward a direction in which the second end of the moveable pin contacts the connection terminal.

The supporting unit may include a power supply protrusion connecting to a power source so that the power supply protrusion is connected to the head portion of the relay terminal when the lamp unit and the supporting unit are coupled to each other.

BRIEF DESCRIPTION OF THE DRAWINGS

The above and other features will become more apparent by describing in detail exemplary embodiments thereof with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein.

Figure 1:
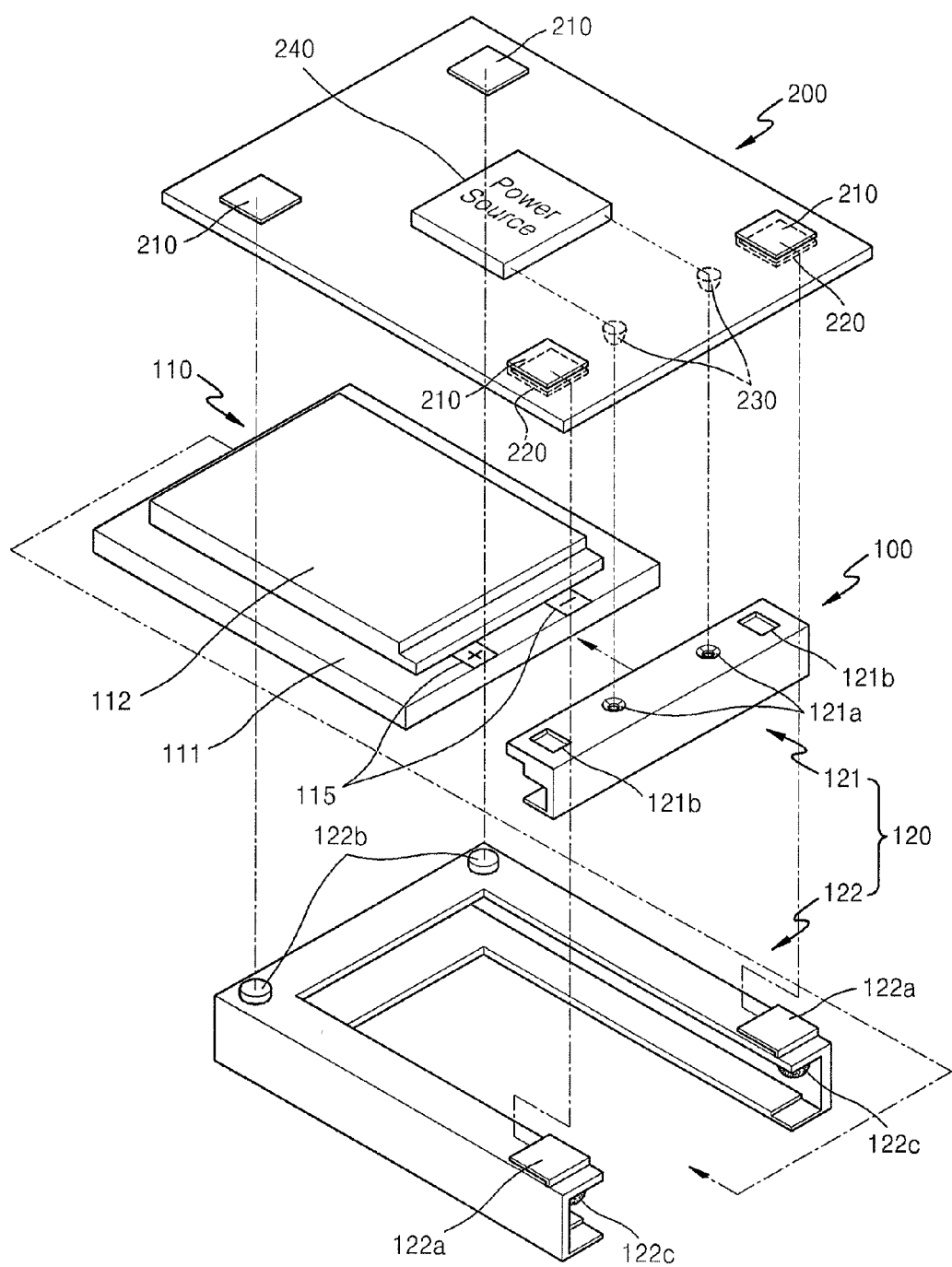
FIG. 1 is an exploded perspective view of an organic light emitting display (OLED) illuminating apparatus according to an embodiment.
Figure 2:
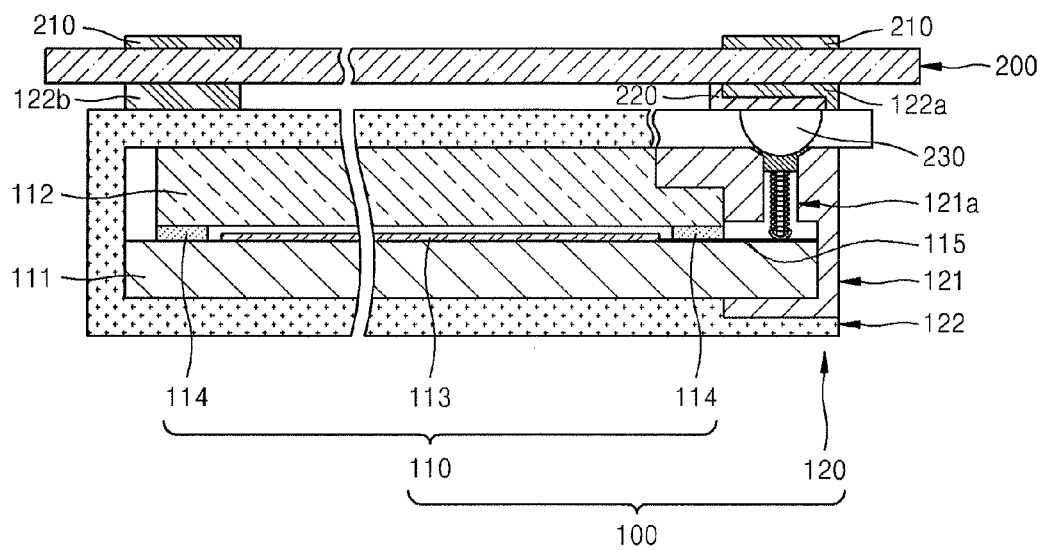
FIG. 2 is a cross-sectional view of a coupling status of the OLED illuminating apparatus shown in FIG. 1.

FIGS. 1 and 2 are diagrams showing an organic light emitting display (OLED) illuminating apparatus respectively in a disassembled state and a coupling state, according to an embodiment.

Referring to FIGS. 1 and 2, the OLED illuminating apparatus of the present embodiment includes a lamp unit 100 emitting light, and a supporting unit 200 supporting the lamp unit 100.

In other words, the lamp unit 100 generates light required to illuminate, and the supporting unit 200 stably supports the lamp unit 100 at a predetermined position.

The lamp unit 100 will be described as follows. As shown in FIG. 2, the lamp unit 100 includes a panel 110 that includes a first substrate 111 on which an organic emission unit 113 is formed, and a second substrate 112 coupled to the first substrate 111 in a state where a sealant 114 is disposed between the first and second substrates 111 and 112 to seal the organic emission unit 113. When a voltage is applied to an anode (not shown) and a cathode (not shown) disposed in the organic emission unit 113, an organic emission layer (not shown) disposed between the anode and the cathode emits light toward a circumference. A connection terminal 115 is formed on the first substrate 111 to connect a power source 240 to electrodes of the organic emission unit 113.

In addition, a housing 120 surrounds the panel 110. The housing 120 includes a first housing 121 installed on a portion of a circumferential surface of the panel 110 and a second housing 122 surrounding a remaining portion of the circumferential surface of the panel 110.

Figure 3:
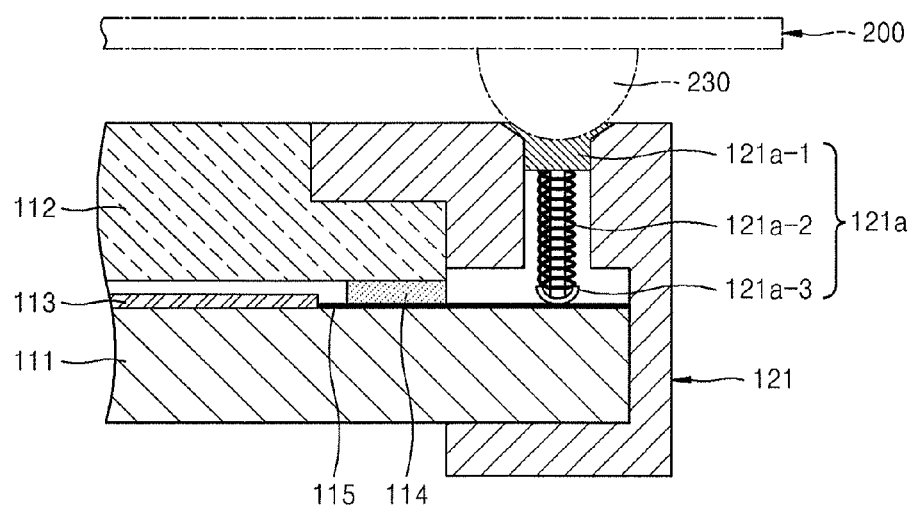
FIG. 3 is a cross-sectional view showing a power source connecting structure in the OLED illuminating apparatus shown in FIG. 1.

The first housing 121 is formed on the portion of the circumferential surface of the panel 110, on which the connection terminal 115 is installed. The first housing 121 includes a relay terminal 121a that is electrically connected to the connection terminal 115. As shown in FIG. 3, the relay terminal 121a includes a head portion 121a-1 fixed in the first housing 121, a movable pin 121a-3 having an end portion that is moveably inserted in the head portion 121a-1 and the other end portion contacting the connection terminal 115, and a spring 121a-2 providing an elastic force in a direction in which the other end portion of the moveable pin 121a-3 contacts the connection terminal 115. When the lamp unit 100 and the supporting unit 200 are coupled to each other, the head portion 121a-1 of the relay terminal 121 contacts a power supply protrusion 230 of the supporting unit 200. In other words, the power supply protrusion 230 and the connection terminal 115 are electrically connected to each other via the relay terminal 121a.

The second housing 122 is installed to surround the circumferential surfaces of the panel 110, except for the circumferential surface on which the first housing 121 is installed. The second housing 122 is detachably coupled to the first housing 121 by a first coupling unit.

Figure 4:
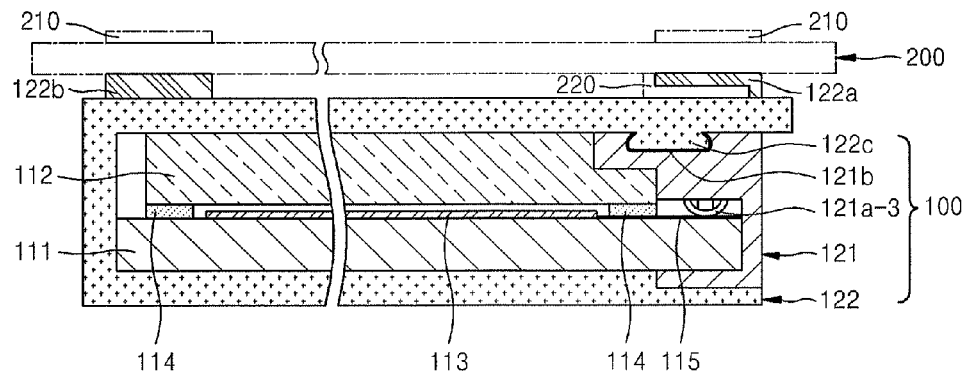
FIG. 4 is a cross-sectional view of a coupling structure of a housing in the OLED illuminating apparatus shown in FIG. 1.

As shown in FIGS. 1 and 4, the first coupling unit may include a coupling recess 121b formed in the first housing 121, and a coupling hook 122c formed on the second housing 122 so as to be elastically inserted in the coupling recess 121b. In other words, the coupling hook 122c of the second housing 122 is inserted into the coupling recess 121b of the first housing 121 and elastically locked in the coupling recess 121b. Accordingly, the first and second housings 121 and 122 are coupled to form the housing 120. The first and second housings 121 and 122 may be formed of an elastic insulating material, i.e., rubber, for ensuring an elasticity and electrical insulating property.

As described above, when the lamp unit 100 is assembled by coupling the first and second housings 121 and 122 to the panel 110, the lamp unit 100 is detachably coupled to the coupling unit 200 by a second coupling unit.

As shown in FIGS. 1 and 4, the second coupling unit may include a plurality of magnetic bodies 122b and 210 disposed on the second housing 122 and the supporting unit 200. For example, a permanent magnet may be installed on an upper surface of the supporting unit 200 as the magnetic body 210. A metal member, i.e., iron (Fe), that may be magnetically coupled to the permanent magnet may be installed on an upper surface of the second housing 122. Accordingly, the lamp unit 100 and the supporting unit 200 are coupled to each other by the coupling of the magnetic bodies 122b and 210, and may be easily separated from each other. The installation locations of the permanent magnet and the metal member may be switched.

In addition, for stably coupling the lamp unit 100 and the supporting unit 200 to each other, first and second slide ribs 220a and 122a are formed. In other words, the first slide rib 220 and the second slide rib 122a are coupled to each other, and form an "L"-shape, as they slide into each other. At the same time, the magnetic coupling of the magnetic bodies 210 and 122b allows the coupling between the lamp unit 100 and the supporting unit 200 to be firm. The second slide rib 122a may be formed of a magnetic material. Thus, after being coupled to the first slide rib 220, the second slide rib 122a is magnetically coupled to the magnetic body 210 of the supporting unit 200.

As shown in FIGS. 1 and 3, when the supporting unit 200 and the lamp unit 100 are coupled to each other by the second coupling unit, the head portion 121a-1 of the relay terminal 121a contacts the power supply protrusion 230 of the supporting unit 200. Consequently, the connection terminal 115 connecting to the organic emission unit 115 and the power source 240 are electrically connected to each other.

The coupling processes of the lamp unit 100 and the supporting unit 200 are performed as shown in FIGS. 5A through 5D.

Figure 5A:
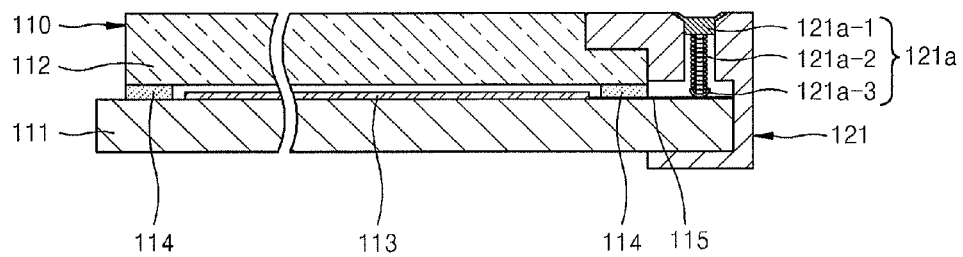
FIGS. 5A through 5D are cross-sectional views illustrating assembling processes of the OLED illuminating apparatus shown in FIG. 1.

Referring to FIG. 5A, the first housing 121 is coupled to the circumferential surface of the panel 110. The relay terminal 121a installed on the first housing 121 is electrically connected to the connection terminal 115 formed on the panel 110.

Figure 5B:
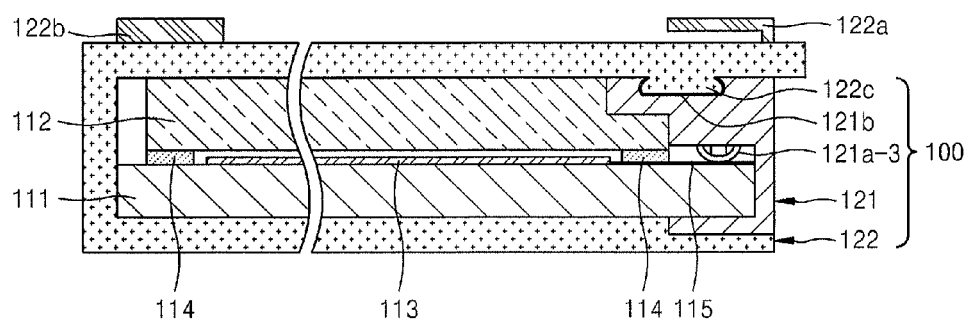

As shown in FIG. 5B, the second housing 122 that surrounds remaining circumferential surfaces of the panel 110 is coupled to the first housing 121. The coupling hook 122c of the second housing 122 is elastically inserted into the coupling recess 121b of the first housing 121 and locked.

Figure 5C:
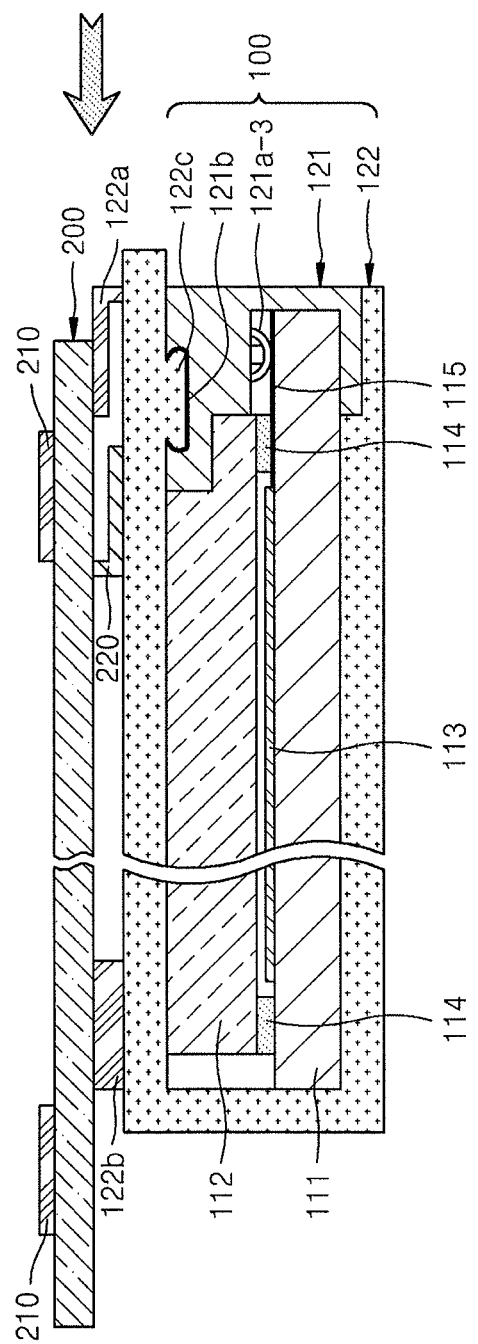

After assembling the lamp unit 100, the first and second slide ribs 220 and 122a slide into each other and couple to each other. Thus, as shown in FIG. 5C, the lamp unit 100 is coupled to the supporting unit 200.

Figure 5D:
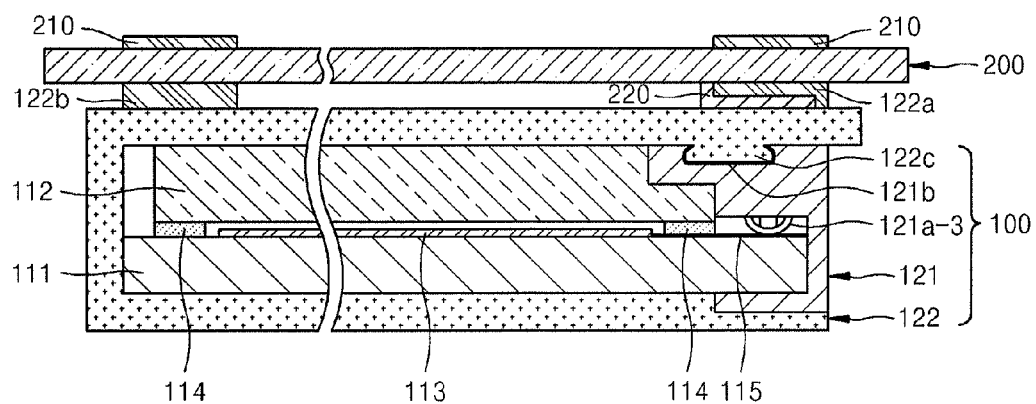

As shown in FIG. 5D, the lamp unit 100 and the supporting unit 200 are coupled to each other. The coupling state of the lamp unit 100 and the supporting unit 200 may be firmly maintained by the magnetic coupling between the magnetic bodies 122a, 122b, and 210. In addition, the power source 240, the power supply protrusion 230, the relay terminal 121a, and the connection terminal 115 are electrically connected to each other so as to supply the electric current to the organic emission unit 113.

When the lamp unit 100 is assembled by coupling the housing 120 to the panel 110 and the lamp unit 100 is coupled to the supporting unit 200, placing of the lamp unit 100 and the electric connection between the power source 240 and the organic emission unit 113 are performed easily. Thus, replacement of the lamp unit 100 may be conveniently performed.

When the lamp unit 100 is separated from the supporting unit 200, the lamp unit 100 is pulled with a force that is slightly greater than the coupling force between the magnetic bodies 122a, 122b, and 210. Thus, the lamp unit 100 and the supporting unit 200 are easily separated. In addition, the elastic locking between the panel 110 and the housing 120 is released when the coupling hook 122c is pulled out of the coupling recess 121b, and the panel 110 and the housing 120 are isolated from each other. Accordingly, the separation and mounting may be performed quickly and conveniently.

By way of summation and review, in order to realize an illuminating apparatus (i.e., street lamp or indoor lamp) with an OLED, a lamp and a supporting unit need to be coupled to each other in a convenient and stable manner. The lamp unit is a light emitting portion and the supporting unit supports the lamp unit. In the illuminating apparatus, the lamp unit is frequently replaced because of damage to the lamp unit and the lifespan of the lamp unit. Thus, the illuminating apparatus may have a disadvantage if it is difficult to couple the lamp unit and the supporting unit to each other. The illuminating apparatus may also have another disadvantage if it is difficult to separate the lamp unit and the supporting unit from each other.

Embodiments are directed to an organic light emitting display (OLED) illuminating apparatus having an improved coupling structure between a lamp unit and a supporting unit. Embodiments are also directed to the OLED illuminating apparatus having an improved connecting structure between the lamp unit and the supporting unit.

According to the OLED illuminating apparatus of the embodiments, the coupling and separating operations of the lamp unit and the supporting unit may be easily and stably performed. Thus, maintenance of the OLED illuminating apparatus may be conveniently performed.

Exemplary embodiments have been disclosed herein, and although specific terms are employed, they are used and are to be interpreted in a generic and descriptive sense only and not for purpose of limitation.

What is claimed is:

1. An organic light emitting display (OLED) illuminating apparatus comprising:
    a lamp unit including a panel with an organic emission unit, a connection terminal electrically connected to the organic emission unit, and a housing coupled to the panel, the housing including a relay terminal that is electrically connected to the connection terminal; and
    a supporting unit detachably coupled to the lamp unit, the supporting unit supporting the lamp unit and supplying electric power to the organic emission unit by connecting to the relay terminal when coupled to the lamp unit.

2. An organic light emitting display (OLED) illuminating apparatus comprising:
    a lamp unit including a panel with an organic emission unit, a connection terminal electrically connected to the organic emission unit, and a housing coupled to the panel, the housing including a relay terminal that is electrically connected to the connection terminal; and
    a supporting unit detachably coupled to the lamp unit, the supporting unit supporting the lamp unit and supplying electric power to the organic emission unit by connecting to the relay terminal when coupled to the lamp unit, wherein the housing includes:
    a first housing including the relay terminal and installed on a portion of a circumferential surface of the panel; and
    a second housing installed to surround a remaining portion of the circumferential surface of the panel.

3. The OLED illuminating apparatus as claimed in claim 2, wherein the first housing and the second housing are formed of elastic insulating materials.

4. The OLED illuminating apparatus as claimed in claim 2, wherein the first housing and the second housing are detachably coupled to each other via a first coupling unit.

5. The OLED illuminating apparatus as claimed in claim 4, wherein the first coupling unit includes a coupling recess formed in the first housing and a coupling hook formed on the second housing so as to be elastically inserted into the coupling recess.

6. The OLED illuminating apparatus as claimed in claim 2, wherein the supporting unit is detachably coupled to the lamp unit via the second housing and a second coupling unit.

7. The OLED illuminating apparatus as claimed in claim 6, wherein the second coupling unit includes a plurality of magnetic bodies installed on the supporting unit and the second housing so as to be magnetically coupled to each other.

8. The OLED illuminating apparatus as claimed in claim 7, wherein the second coupling unit further includes a first slide rib on the supporting unit, and a second slide rib on the second housing, the first and second slide ribs being slidable into and out of a coupling engagement with each other.

9. The OLED illuminating apparatus as claimed in claim 8, wherein the second slide rib includes a magnetic body.

10. The OLED illuminating apparatus as claimed in claim 2, wherein the relay terminal includes:
    a head portion fixed in the first housing;
    a moveable pin having a first end moveably inserted into the head portion and a second end contacting the connection terminal; and
    a spring for providing an elastic force toward a direction in which the second end of the moveable pin contacts the connection terminal.

11. The OLED illuminating apparatus as claimed in claim 10, wherein the supporting unit includes a power supply protrusion connecting to a power source so that the power supply protrusion is connected to the head portion of the relay terminal when the lamp unit and the supporting unit are coupled to each other.

* * * * *